(12) United States Patent
Cho

(10) Patent No.: US 12,090,698 B2
(45) Date of Patent: Sep. 17, 2024

(54) METHOD OF MANUFACTURING MOUTHPIECE FOR WIND INSTRUMENT

(71) Applicant: Myung Sub Cho, Incheon (KR)

(72) Inventor: Myung Sub Cho, Incheon (KR)

( * ) Notice: Subject to any disclaimer, the term of this patent is extended or adjusted under 35 U.S.C. 154(b) by 0 days.

(21) Appl. No.: 17/942,261

(22) Filed: Sep. 12, 2022

(65) Prior Publication Data

US 2023/0106922 A1 Apr. 6, 2023

(30) Foreign Application Priority Data

Oct. 6, 2021 (KR) ........................ 10-2021-0132468

(51) Int. Cl.
*B29C 48/00* (2019.01)
*B29B 7/90* (2006.01)
*B29L 31/00* (2006.01)

(52) U.S. Cl.
CPC ............ *B29C 48/0022* (2019.02); *B29B 7/90* (2013.01); *B29C 48/022* (2019.02); *B29C 2793/009* (2013.01); *B29L 2031/758* (2013.01)

(58) Field of Classification Search
CPC .... B29C 48/0022; B29C 48/022; G10D 9/02; B29L 2031/758
See application file for complete search history.

(56) References Cited

U.S. PATENT DOCUMENTS

| 3,997,494 A | * | 12/1976 | Lever | ...................... B29C 48/15 524/577 |
| 2006/0174753 A1 | | 8/2006 | Aisenbrey | |
| 2012/0222539 A1 | * | 9/2012 | Gandara | .................. G10D 7/03 84/383 R |
| 2015/0299504 A1 | * | 10/2015 | Kang | ...................... C08J 7/043 428/209 |

FOREIGN PATENT DOCUMENTS

| BE | 510054 A | * | 4/1952 | |
| KR | 10-1990-0004895 B1 | | 7/1990 | |
| KR | 10-0900756 B1 | | 6/2009 | |
| KR | 10-1410824 B1 | | 6/2014 | |
| WO | WO-2021149524 A1 | * | 7/2021 | ............. B29B 7/483 |

* cited by examiner

*Primary Examiner* — Farah Taufiq
*Assistant Examiner* — Timothy G Hemingway
(74) *Attorney, Agent, or Firm* — KORUS Patent, LLC; Seong Il Jeong

(57) ABSTRACT

Disclosed herein is a method of manufacturing a mouthpiece for a wind instrument. The method of manufacturing a mouthpiece for a wind instrument includes the steps of: pulverizing a first material made of a synthetic resin material and a second material made of a mineral material; mixing the first and second materials at a predetermined ratio; melting the mixed materials and continuously extruding a primarily shaped product having a uniform sectional shape; cutting the extruded primarily shaped product into cut primarily shaped products at predetermined intervals; and forming secondarily shaped products by machining the cut primarily shaped products into mouthpiece shapes.

1 Claim, 2 Drawing Sheets

METHOD OF MANUFACTURING MOUTHPIECE FOR WIND INSTRUMENT

CROSS-REFERENCE TO RELATED APPLICATION

This application claims the benefit of Korean Patent Application No. 10-2021-0132468 filed on Oct. 6, 2021, which is hereby incorporated by reference herein in its entirety.

BACKGROUND

1. Technical Field

The present invention relates generally to a method of manufacturing a mouthpiece for a wind instrument, and more particularly to a method of manufacturing a mouthpiece for a wind instrument by which a mouthpiece used for the mouth when a wind instrument is played is manufactured in the form in which a high-strength mineral material and a synthetic resin material have been mixed together such that the mouthpiece can have excellent resonance, so that the mouthpiece allows the corresponding wind instrument to be played easily and provides clear and rich sound, by which mass production is enabled and manufacturing cost can be lowered by improving a manufacturing process, and by which the manufacturing method is made environment-friendly by recycling waste resources as materials.

2. Description of the Related Art

Generally, wind instruments refer to instruments that make sound by allowing air to be blown into a tube through the mouth, such as recorders, saxophones, tubas, horns, bassoons, cornets, bugles, trumpets, and trombones. The sound of a wind instrument is governed by the structure and length of the instrument itself and the vibrations of air blown by a player through a mouthpiece coupled to the wind instrument.

In greater detail, a mouthpiece coupled to a wind instrument corresponds to a part in which vibrations of air generate first in the process of blowing air with a player's lips put on the mouthpiece. The vibrations of air generated in this case vibrate the air in a tube and expand sound volume. The mouthpiece is an important factor that determines the tone, pitch, and duration of sound, which varies significantly depending on the shape and material of the mouthpiece.

Most of the mouthpieces used so far have been made by hand, so that the manufacturing efficiency thereof is not desirable. The mouthpieces, which are currently generally manufactured and widely distributed, are made of hard rubber or metal. Although a mouthpiece made of hard rubber has the advantage of being cheaper than a mouthpiece made of metal, it has disadvantages in that it is less durable and does not produce rich sound due to the poor thermal conductivity thereof. In contrast, although the metal mouthpiece has excellent thermal conductivity, it has problems in that it is not suitable for soft sound and the tone is hard due to the properties of the material.

As a related art, Korean Patent No. 10-0900756 (entitled "Mouthpiece for Musical Instrument Containing Silver Nano Particles") discloses a technology in which silver nano (120) powder or a silver nano solution formed by diluting silver nano powder is applied on the outer surface of a mouthpiece body to a micro-level thickness through any one of deposition, lamination, thin filming, sedimentation, plating, and spraying including dry or wet coating.

The above related art is a technology in which a silver nano coating is applied to a mouthpiece. Although it may have the antibacterial function of a silver material, it has a problem in that the durability of the mouthpiece or the tone cannot be adjusted using the coating layer having nano-sized particles, and does not include a manufacturing process for increasing manufacturing efficiency.

RELATED ART LITERATURE

Patent document 1: Korean Patent No. 10-0900756 (entitled "Mouthpiece for Musical Instrument Containing Silver Nano Particles")

Patent document 2: Korean Patent No. 10-1410824 (entitled "Method of Manufacturing Mouthpiece for Wind Instrument and Mouthpiece for Wind Instrument")

SUMMARY

The present invention has been conceived to overcome the above-described problems, and an object of the present invention is to provide a method of manufacturing a mouthpiece for a wind instrument that is manufactured in the form in which a mineral material and a synthetic resin material have been mixed together such that the properties of the mineral material and the properties of the synthetic resin material can be applied together in each single mouthpiece, so that the mouthpiece of the present invention has high durability compared to an existing mouthpiece, and excellent resonance is achieved due to the material properties, thereby producing sound more easily and providing clear and rich sound.

Another object of the present invention is to provide a method of manufacturing a mouthpiece for a wind instrument that can efficiently mix a mineral material and a synthetic resin material, can minimize the defect rate by preventing the mineral material from being separated, and can provide a manufacturing method suitable for mass production, thereby providing a high-quality mouthpiece while lowering the price of the mouthpiece.

According to an aspect of the present invention, there is provided a method of manufacturing a mouthpiece for a wind instrument, the method including the steps of: pulverizing a first material made of a synthetic resin material and a second material made of a mineral material; mixing the first and second materials at a predetermined ratio; melting the mixed materials and continuously extruding a primarily shaped product having a uniform sectional shape; cutting the extruded primarily shaped product into cut primarily shaped products at predetermined intervals; and forming secondarily shaped products by machining the cut primarily shaped products into mouthpiece shapes.

Hard rubber may be applied as the first material in the pulverizing step.

At least one of gold, silver, copper, lead, zinc, iron, manganese, tungsten, molybdenite, tin, bismuth, stibnite, limestone, dolomite, silica, silica sand, feldspar, serpentine, kaolin, graphite, talc, agalmatolite, diatomite, asbestos, fluorspar, mica, sericite, andalusite, alluvial gold, monazite, zircon, ilmenite, magnetite, and garnet may be applied as the second material in the pulverizing step.

The second material may be mixed in a proportion of 10 to 70 parts by weight in the mixing step.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings. In the following description of the present invention, when it is determined that a detailed description of a related known function or configuration may unnecessarily obscure the gist of the present invention, the detailed description will be omitted.

Figure 1:
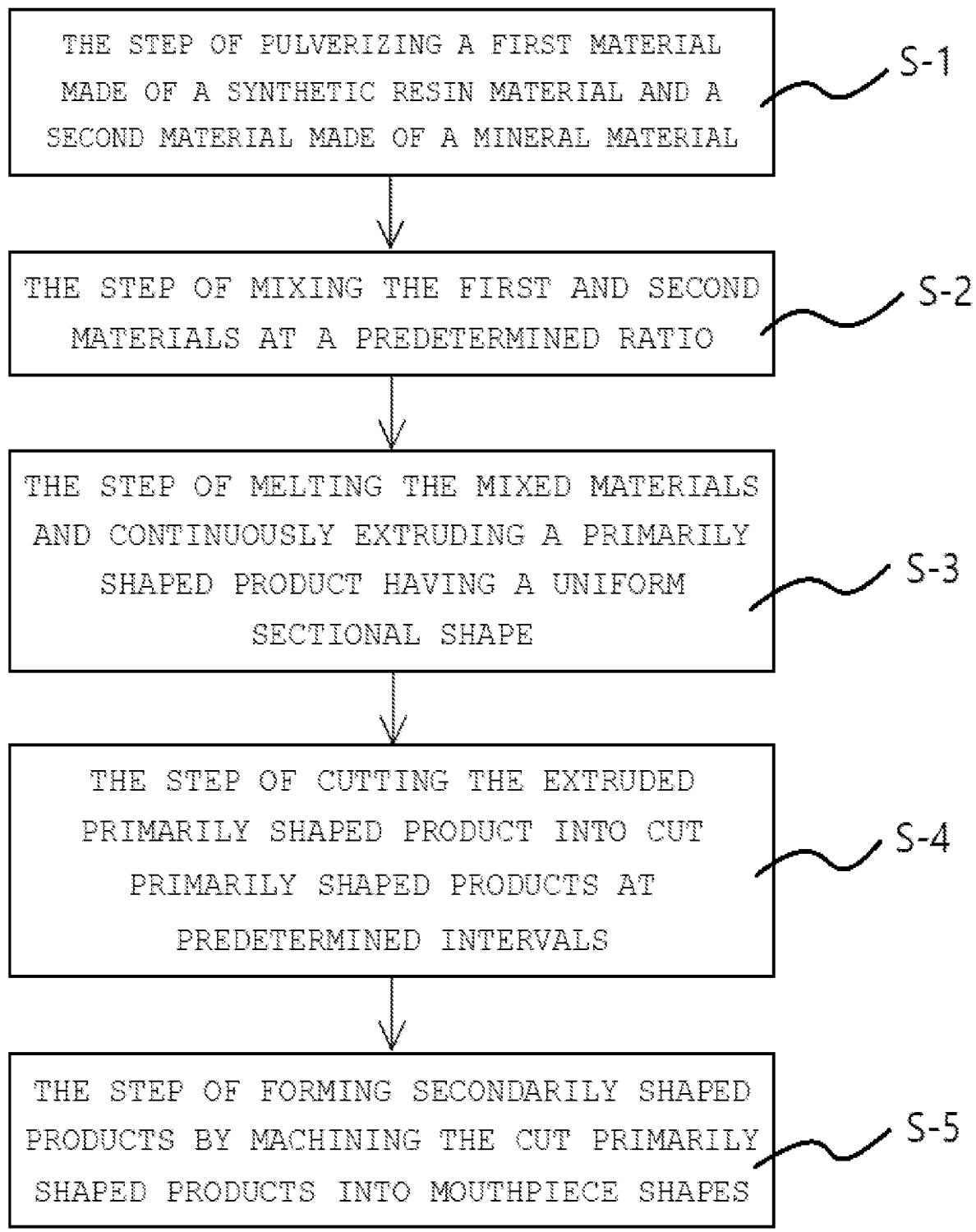
FIG. 1 is a block diagram showing a method of manufacturing a mouthpiece for a wind instrument according to the present invention.

As shown in FIG. 1, a method of manufacturing a mouthpiece for a wind instrument according to the present invention includes: step S-1 of pulverizing a first material made of a synthetic resin material and a second material made of a mineral material; step S-2 of mixing the first and second materials at a predetermined ratio; step S-3 of melting the mixed materials and continuously extruding a primarily shaped product having a uniform sectional shape; step S-4 of cutting the extruded primarily shaped product into cut primarily shaped products at predetermined intervals; and step S-5 of forming secondarily shaped products by machining the cut primarily shaped products into mouthpiece shapes.

Pulverizing step S-1 is the process of pulverizing the first material of the synthetic resin material and the second material of the mineral material by pulverizing the first and second materials through pulverizers. Since there is a difference in strength between the first and second materials, it is preferable to use different pulverizers and pulverize the first and second materials in different environments. In this case, in order to meet the mixing ratio, it is preferable to pulverize the first and second materials into particles having the same size.

Hard rubber may be applied as the first material. At least one of metallic mineral materials such as gold, silver, copper, lead, zinc, iron, manganese, tungsten, molybdenite, tin, bismuth, stibnite and rare earths, non-metallic mineral materials such as limestone, dolomite, silica, silica sand, feldspar, serpentine, kaolin, graphite, talc, agalmatolite, diatomite, asbestos, fluorspar, mica, sericite and andalusite, and placer mineral resources such as alluvial gold, monazite, zircon, ilmenite, magnetite and garnet may be applied as the second material.

Additionally, when the first and second materials are manufactured using discarded waste resources, the wastes may be effectively processed, thereby providing an environment-friendly manufacturing method. When waste resources are used as the first and second materials as described above, it is preferable to further undergo a foreign material removal process and a washing process in the above-described pulverization step.

Step S-2 of mixing the materials at the predetermined ratio corresponds to the mixing process of introducing the first and second materials into a single mixer at the predetermined ratio and then mixing them uniformly. The second material introduced in the mixing process is provided in a mixing proportion of 10 to 70 parts by weight. The reason why the mixing range of the second material is wide as described above is to adjust the tone according to the preference or tendency of a performer because the tone changes depending on the amount of the second material used for the mixing. In other words, the amount of the second material used for the mixing is decreased when a soft tone is desired, and the amount of the second material used for the mixing is increased when a strong tone is desired.

Although the mixing proportion of the second material is wide as described above, a problem arises in that desirable shaping is not performed because the properties of the mineral material are excessively low and thus the effects thereof are decreased when the mixing proportion of the second material is lower than 10 parts by weight and because the proportion of the first material responsible for molding is relatively low when the mixing proportion of the second material exceeds 70 parts by weight.

Continuously extruding step S-3 is the process of melting the materials in the state in which the first and second materials have been mixed at the predetermined ratio in an extruder and continuously extruding the primarily shaped product having the uniform sectional shape in the form of a rod. In this process, it is preferable that the melting temperature is not set to melting temperature of the second material corresponding to a mineral material, but is set based on the first material corresponding to a synthetic resin material.

When the materials are melted at an excessively high temperature, a problem arises in that the properties of the first material may be lost.

However, when a material having a low melting temperature among various mineral materials is exceptionally applied as the second material, the melting temperature may be set such that both the first material and the second material can be melted at the melting temperature.

Cutting step S-4 is the process of cutting the primarily shaped product, extruded into the rod, at the predetermined intervals. In this case, the cutting intervals may be freely adjusted according to the size of the mouthpiece, and the cutting process is performed after the primarily shaped product has been completely dried.

In addition, step S-5 of forming the secondarily shaped products is the process of introducing the primarily shaped product, cut into the size of the mouthpiece, into a precise machining machine for cutting the surfaces of an object and forming secondarily shaped products by precisely machining the cut primarily shaped products into mouthpieces.

The present invention has the advantage of significantly increasing manufacturing efficiency when a rod-shaped primarily shaped product having no mouthpiece shape is cut first and then precisely machined into secondary shaped products. The solid primarily shaped product in which the first and second materials have been uniformly mixed is cut and machined into secondary shaped products having a mouthpiece shape, so that there is no concern that the mineral material is separated from the shaped mouthpieces and there is an advantage in which the distribution of the mineral material may be made uniform.

If the shaping is performed using a simple molding method, there are problems in that manufacturing efficiency is lowered, the mineral material is separated, and the mineral material included in each mouthpiece is moved to one side during a molding process.

Figure 2:
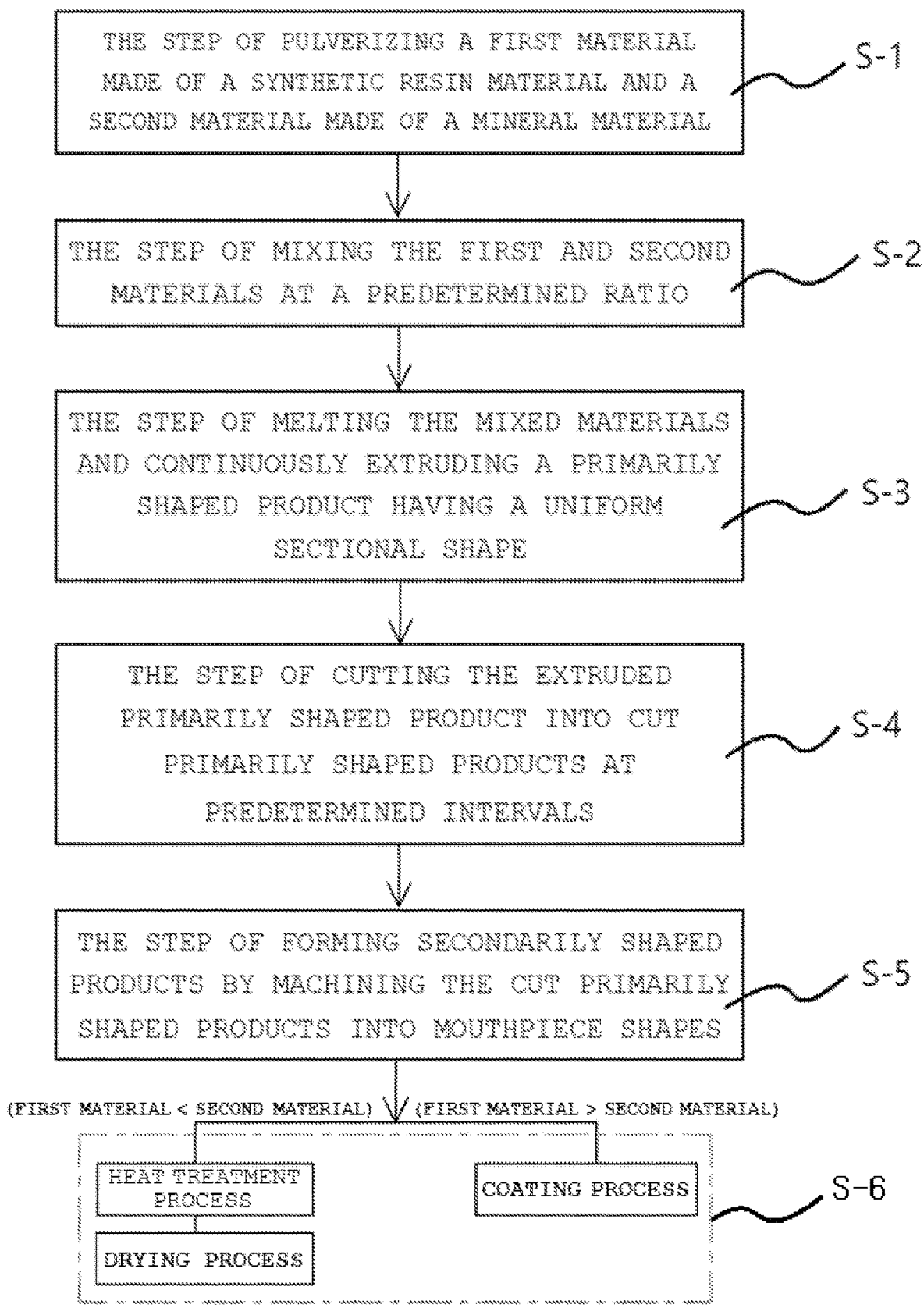
FIG. 2 is a block diagram showing an embodiment further including a post-processing step in the method of manufacturing a mouthpiece for a wind instrument of the present invention.

In addition, the present invention may further include post-processing step S-6 of strengthening the surfaces of the mouthpieces after step S-5 of forming the secondarily shaped products, as shown in FIG. 2. Post-processing step S-6 may vary depending on the mixing proportion of the second material. Post-processing step S-6 may be performed through a heat treatment process and a drying process when the mixing proportion of the second material is larger than that of the first material, and may be performed through a surface coating process when the mixing proportion of the second material is lower than that of the first material.

Although the present invention has been described above with reference to the above embodiments, it will be apparent that various modifications may be made within the scope of the technical spirit of the present invention.

According to the present invention, the mouthpiece is manufactured after the mineral material and the synthetic resin material have been pulverizing and mixed together, so that it is possible to provide higher durability than the existing mouthpiece while increasing the intensity of vibration per second and periodicity of vibration due to the properties of the mineral material, with the result that excellent resonance is generated, thereby providing the effect of making it easy to play a corresponding wind instrument and the effect of being suitable for the representation of clear tones, rich volumes, dynamic pitches (the representation of pitches—in which soft notes are represented as being softer, and strong notes are represented as being stronger), and note values with reverberations (the durations of notes).

Furthermore, the present invention provides the manufacturing method that can minimize the defect rate by pulverizing the materials and then mixing them so that the mineral material can be prevented from being separated in the primary and secondary shaping processes and that is suitable for mass production, thereby providing the effect of providing a high-quality mouthpiece while allowing the price of the mouthpiece to be lowered.

Moreover, the present invention allows the mineral material and the synthetic resin material to be manufactured using waste resources that are discarded, thereby providing the effects of reducing wastes and being environmentally friendly.

What is claimed is:

1. A method of manufacturing mouthpieces for a wind instrument, the method comprising:
    step S-1 of pulverizing a first material made of a synthetic resin material and a second material made of a mineral material into particles having a substantially same size wherein hard rubber is applied as the first material, and at least one of gold, silver, copper, lead, zinc, iron, manganese, tungsten, molybdenite, tin, bismuth, stibnite, limestone, dolomite, silica, silica sand, feldspar, serpentine, kaolin, graphite, talc, agalmatolite, diatomite, asbestos, fluorspar, mica, sericite, andalusite, alluvial gold, monazite, zircon, ilmenite, magnetite, and garnet is applied as the second material;
    step S-2 of mixing the first and second materials at a predetermined ratio wherein the second material is mixed in a proportion of 10 to 70 parts by weight out of 100 parts by weight;
    step S-3 of melting the mixed materials and continuously extruding a primarily shaped product having a same sectional shape, a temperature for the melting step S-3 being set based on a melting temperature of the first material;
    step S-4 of cutting the extruded primarily shaped product into cut primarily shaped products at predetermined intervals;
    step S-5 of forming secondarily shaped products by machining the cut primarily shaped products into the mouthpieces; and
    step S-6 of strengthening surfaces of the mouthpieces formed in the forming step S-5 wherein the strengthening step S-6 is performed through a heat treatment process and a drying process when the mixing proportion of the second material is larger than that of the first material, and is performed through a surface coating process when the mixing proportion of the second material is lower than that of the first material.

* * * * *